United States Patent [19]

Ryan

[11] 4,229,767
[45] Oct. 21, 1980

[54] BEAM CONTROL CIRCUIT FOR DIODE-GUN TYPE CAMERA TUBES

[75] Inventor: John O. Ryan, Cupertino, Calif.

[73] Assignee: Ampex Corporation, Redwood City, Calif.

[21] Appl. No.: 23,512

[22] Filed: Mar. 23, 1979

[51] Int. Cl.$^2$ .................. H04N 5/197; H04N 9/09
[52] U.S. Cl. ................................ 358/219; 358/74
[58] Field of Search .................... 358/219, 223, 74

[56] References Cited

U.S. PATENT DOCUMENTS

| 2,930,929 | 3/1960 | Shelton | 358/219 |
|---|---|---|---|
| 3,392,236 | 7/1968 | Nielsen et al. | 358/219 |
| 3,999,011 | 12/1976 | Sato et al. | 358/219 |

*Primary Examiner*—John C. Martin
*Attorney, Agent, or Firm*—George B. Almeida

[57] ABSTRACT

A beam control circuit which instantaneously increases beam current just sufficiently to discharge a highlight, utilizes the fact that a substantially linear relationship exists between the grid current and the available beam current of a diode-gun camera tube. A tube grid control circuit provides means for calibrating the relationship between the incoming signal current and the available beam current. A highlight enable circuit coupled to the grid control circuit is pre-biased whereby the beam current of the tube is maintained at a constant value as long as the video signal current remains within its normal operating range, i.e., there are no highlights in the viewed scene. However, when the video signal current increases above the pre-bias level, as in the presence of a highlight, the highlight enable circuit conducts to cause a corresponding increase in the beam current of the tube, wherein the beam current maintains a pre-calibrated, substantially constant margin above the video signal current which is just sufficient to discharge the highlight.

12 Claims, 2 Drawing Figures

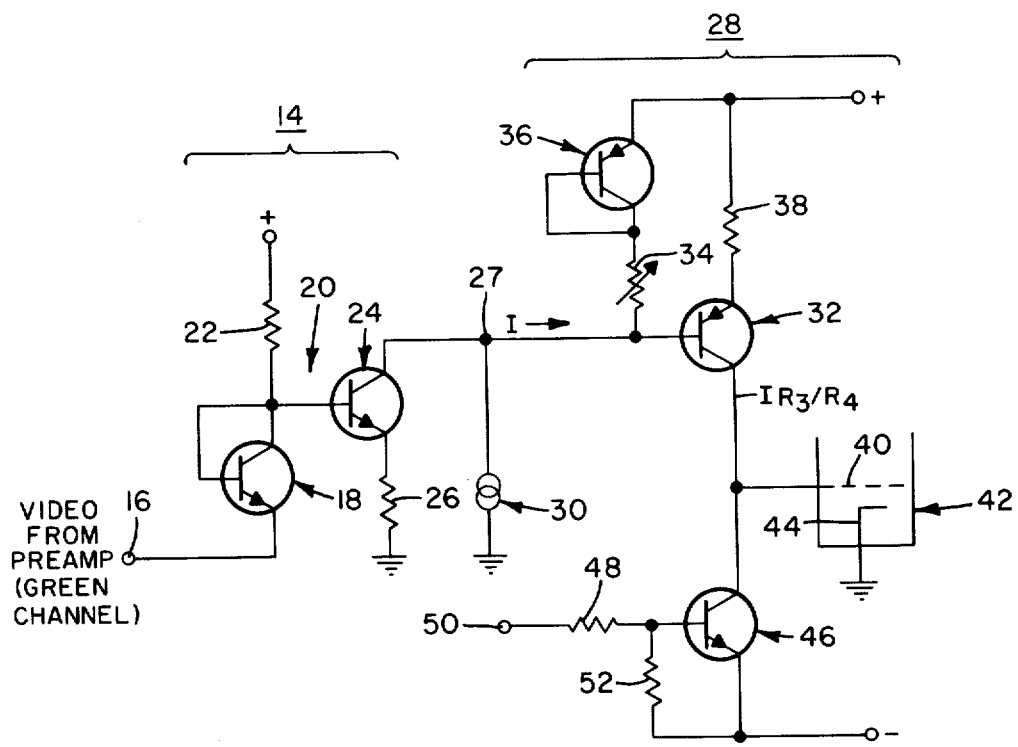
FIG_1
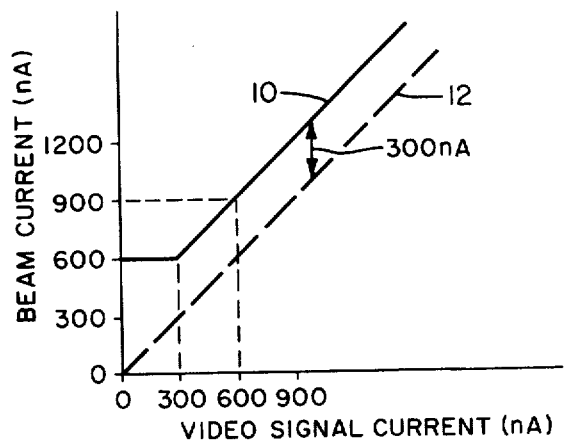
FIG_2

BEAM CONTROL CIRCUIT FOR DIODE-GUN TYPE CAMERA TUBES

BACKGROUND OF THE INVENTION

1. Field

The invention relates to highlight suppression circuits, and particularly to a circuit for controlling the beam current of a diode-gun camera tube and the like.

2. Prior Art

In camera pickup tubes typically exemplified by those tubes known as vidicons or plumbicons, the beam current of the electron beam which scans the target electrode thereof, is generally maintained within its normal operating range corresponding to the normal operating range of the video signal, in order to insure optimum tube resolution. That is, it is generally known that increasing the beam current of an electron beam which scans a target electrode above its given normal operating range generally causes a defocusing of the electron beam and thus a loss of resolution of the video picture.

In the event of the occurrence of highlights in the viewed scene, it is necessary that the photoelectric conversion surface of the target electrode be neutralized, generally by increasing the beam current to discharge the excess accumulation of charges on the target electrode of a pickup tube in the area of the highlight. However, one of the disadvantages inherent in pickup tubes when suppressing highlights by an increase in the beam current is that the use of a high intensity beam to discharge the excessive charges caused by the highlight also generates excessive soft x-rays, which bombard the target thereby significantly reducing the lifetime of the pickup tube. Thus, it is generally necessary to compromise the increase in beam current in order to provide the maximum highlight suppression possible while simultaneously maintaining the optimum lifetime of the pickup tube.

There are various techniques presently known which provide for highlight suppression in pickup tubes, wherein the techniques involve some means for increasing the beam current to discharge the excessive charges on the target electrode of the pickup tube caused by the presence of a highlight. The circuits corresponding to such techniques are commonly known by the general terms of anti-comet tail, automatic beam optimization, and automatic beam control, etc., circuits. Typical of the anti-comet tail circuits are those which increase the beam current during either the active or the flyback periods of the electron beam scan, and exemplified by way of example in U.S. patent application Ser. No. 802,839, to R. Salem, et al., and assigned to the same assignee as this application. This anti-comet tail circuit provides an increase in beam current only during the flyback period, and only "on demand", i.e., upon the occurrence of a highlight. Typical of automatic beam optimization and/or control circuits, are those described in U.S. Pat. Nos. 3,999,011 to K. Sato, et al., and 2,930,929 to C. Sheldon. Such circuits provide highlight suppression during the active period of the electron beam scan and in response to the presence of a highlight in the video picture being viewed. The circuits variously include some means by which the beam and/or cathode current is monitored, and the resulting control voltage signal is fed back to the grid of the tube via a generally complex negative feedback circuit which in turn provides the desired controlled increase in the beam as required to suppress the highlight effects.

All the above techniques are utilized with standard pickup tubes of the types known as vidicons, plumbicons, etc., which possess the characteristic that no current flows in the control grids between the grid voltage and the beam current. Whereupon the beam optimization circuits of previous mention utilize the generally linear relationship between the cathode current and the beam current to provide the negative feedback of control voltage to control the grid and thus the beam current.

Very recently, an improved camera pickup tube has been developed which is generally known as a diode-gun tube utilizing lead oxide target plumbicons, saticons, etc., wherein increased beam currents may be applied without unduly deteriorating the lifetime of the tube. Further, such diode-gun tubes have the characteristic that current flows in the control grid thereof, and a substantially linear relationship exists between the grid current and the available beam current.

SUMMARY OF THE INVENTION

The present invention provides a beam control circuit for use with diode-gun pickup tubes which instantaneously increases the beam current in response to a highlight, by an amount which is only sufficent to discharge the highlight, while insuring that the beam current is held at a level consistent with minimum picture degradation and maximum tube life in the absence of a highlight. The system does not require beam or cathode current monitoring, nor the associated feedback of corresponding voltages to control the levels of the beam current during the existence of highlights.

To this end, a tube grid control circuit is coupled to the grid of a diode-gun camera tube, with a highlight enable circuit coupled in turn to the tube grid control circuit. The highlight enable circuit is pre-biased such that the pickup tube operates in its normal range consistent with the normal range of video signal current in the absence of highlights. Upon the occurrence of a highlight, the highlight enable circuit enables the tube grid control circuit, which drives the grid of the pickup tube to generate a correspondingly increased beam current. The grid control circuit is calibrated to provide a beam current which increases in a manner such that a substantially constant, preselected margin is maintained above the incoming video signal current as the latter increases due to the presence of highlights.

BRIEF DESCRIPTION OF THE DRAWINGS

FIG. 1 is a schematic diagram of the beam control circuit of the invention.

FIG. 2 is a graph depicting the relationship, i.e., the preselected constant margin, between the video signal current and the available beam current, as maintained by the circuit of FIG. 1.

DESCRIPTION OF THE PREFERRED EMBODIMENTS

The beam control circuit of description herein, utilizes the fact that a substantially linear relationship exists between the grid current and the available beam current of a diode-gun camera tube. Thus, by way of example, if one milliamp (mA) of grid current provides 300 nanoamps (nA) of beam current, then two mA of grid current will provide 600 nA of beam current, etc. However, the magnitude of the proportionality constant is generally not known and will vary between different tubes. Accordingly, the beam control circuit employs means for its calibration such that the proportionality constant is of no concern but is compensated for automatically.

Referring initially to FIG. 2, a substantially linear relationship is desired between the video signal current and the beam current of the tube, as depicted by the curve 10.

If the signal current were to be plotted on the graph, it would appear as linear curve 12 which extends substantially parallel to the curve 10. Thus, as the video signal current increases above, for example, 300 nA (the upper limit of the normal video signal current operating range in the absence of highlights), the beam current also increases linearly to maintain substantially the same difference margin therebetween.

FIG. 1 depicts, by way of example only, one implementation of the beam control circuit in accordance with the invention combination. Although a single channel of electronics is shown, e.g., the green channel, two additional channels are utilized for the red and blue video signal channels. Thus, the video signal generated by the preamplifier of the video processing circuitry (not shown) of a conventional camera system is introduced at input 16 of a highlight enable circuit 14, and particularly to the emitter electrode of a first stage 18 of a dual transistor 20. The collector of stage 18 is coupled via a resistor 22 to a positive voltage, and the base thereof is coupled to the collector and thence to the base of a second stage 24 of dual transistor 20. Transistor stage 18 provides means for compensating for temperature variations. The emitter of stage 24 is coupled to ground via a resistor 26 while the collector thereof generates the output of the highlight enable circuit 14 at a junction 27.

The junction 27 of the highlight enable circuit 14 corresponds to the input to a tube grid control circuit 28. The junction 27 is coupled to one side of a current source 30, whose other side is grounded. The junction 27 is coupled to the base of a transistor 32, and to one side of a variable resistor 34 whose other side is coupled across the base and collector of a transistor 36. The emitter of transistor 36 is coupled to a positive voltage, and also via a resistor 38 to the emitter of the transistor 32. The collector of transistor 32 extends to the control grid 40 of a diode-gun tube 42, whose cathode 44 is coupled to ground.

The control grid 40 is also coupled to a collector of a transistor 46, whose base is coupled to a conventional blanking signal of the video camera system via a resistor 48 and input line 50. The base thereof is also coupled via a resistor 52 to the emitter of transistor 46 and thence to a negative voltage source.

The transistors 36 and 32, in conjunction with the resistors 34 and 38, form a multiplying current mirror; i.e., a signal current I at junction 27 results in a collector current in transistor 32 which equals the current I multiplied by the ratio of the values of the resistor 34 to the resistor 38. Thus, the variable resistor 34 provides, inter alia, means for calibrating the tube grid control circuit 28, and particularly for establishing the magnitude of the proportionality between the current at junction 27 and the available beam current of tube 42.

The calibration is accomplished by applying an arbitrary reference current of, for example, 2 mA to the junction 27 via the current source 30. The camera iris (not shown) of the video camera system is adjusted utilizing the conventional test chart to provide a peak signal current of the order of 600 nA, wherein 600 nA is selected as being twice the upper limit of the normal video signal current in the absence of highlights. The resistor 34 is then adjusted to reduce its resistence, thereby reducing the beam current in tube 42 until the 600 nA signal begins to collapse. The condition now exists that a current of 2 mA entering junction 27 to the tube grid control circuit 28 produces the equivalent of 600 nA of beam current. Now if an increase of signal over 2 mA current occurs, as due to the occurrence of a highlight, the beam current is correspondingly increased.

The transistor 20 of the highlight enable circuit 14 converts the video signal from the preamplifier into a proportional current entering the junction 27. The preamplifier generally has a sensitivity of one millivolt per one nanoamp of video signal current and, in the absence of signal current, the output of the preamplifier is set at −0.3 volts by, for example, a clamping circuit (not shown). The pre-biasing arrangement of transistor 20 is selected such that no collector current flows into the junction 27 until the output of the preamplifier reaches the zero volt level, corresponding to a video signal current of 300 nA. Thus, the beam current of the tube 42 remains at the preselected constant value of 600 nA during the normal video signal operating range of from zero to 300 nA. However, when the video signal current increases above the 300 nA level, as in the presence of highlights, the transistor 24 conducts and causes the beam current of the tube 42, via the tube grid control circuit 28, to correspondingly increase, whereby the beam current maintains a substantially constant margin of 300 nA above the value of the video signal current, as depicted in FIG. 2 by curves 10, 12. Thus, if the video signal current increases to 400 nA or 500 nA due to respective highlights, the beam current increases to values of 700 nA and 800 nA, respectively, to efficiently suppress the effects of the specific highlights. The value of the resistor 26 insures the constant difference margin of 300 nA, herein selected by way of example only, between the beam current and the video signal current during the presence of highlights.

During the active portion of the scanning time, the transistor 46 is turned off in the absence of a blanking signal via terminal 50, and all of the current from the collector of transistor 32 flows into the control grid 40 of tube 42. During the blanking interval of the signal on terminal 50, the transistor 46 is saturated, which reverse-biases the grid 40 and absorbs all of the collector current from transistor 32, thereby shutting off the pickup tube 42.

It is understood that although specific values of currents, voltages, resistance, etc., have been employed herein, other values commensurate with the operating parameters, types of camera systems, circuit components, etc., may be employed, and that the specific values have been used only by way of clarifying the description of the instant beam control system.

Likewise, although the curves 10, 12 of FIG. 2 are depicted as parallel throughout their values shown here, there are practical limits to the extent to which the pre-calibrated (300 nA) margin is maintained due to the operating parameters of the diode-gun tube 42.

As previously mentioned, only one channel of the instant beam control circuit is described herein, whereas three similar channels are employed in a three tube camera, one for each tube. In the event the highlight affects only a specific color, only the respective color channel is affected. However, most highlights are specular and all three color channels operate a described above.

I claim:

1. In a camera pickup tube having a substantially linear relationship between the grid current and the beam current thereof, a control circuit for controlling the beam current with respect to a video signal current, comprising the combination of;
   highlight enable means coupled to the video signal current and pre-biased to a given upper limit of a normal video signal current operating range;
   tube grid control means coupled to the grid and including means for pre-calibrating a relationship between the video signal current and any change in the beam current caused thereby; and
   said tube grid control means is responsive to the highlight enable means in the presence of highlights, to generate increases in beam current which maintain a selected margin corresponding to the pre-calibrated relationship.

2. The control circuit of claim 1 wherein the highlight enable means includes;
   transistor means pre-biased to said given upper limit and responsive to video signal currents exceeding the limit to enable the tube grid control means.

3. The control circuit of claim 2 wherein the pre-calibrating means includes;
   adjustable resistance means for providing a selected beam current given a selected video signal current commensurate with the pre-biased upper limit of the highlight enable means.

4. The control circuit of claim 3 wherein;
   said transistor means includes a selected pre-bias resistance and generates an enable signal only when the video signal current exceeds the given upper limit due to the presence of a highlight; and
   said pre-calibrating means maintains a corresponding increase in the beam current commensurate with the selected margin relationship between the beam current and the video signal current as the video signal current exceeds the given upper limit.

5. The control circuit of claim 4 wherein;
   the transistor means includes a dual transistor, wherein the first stage is coupled to the video signal current and provides temperature compensation, the second stage is coupled to the first stage and provides an output junction therefrom, said second stage being pre-biased to said given upper limit;
   the control circuit including a current source coupled to the second stage output junction; and
   the tube grid control means including a pair of transistors coupled to define a multiplying current mirror circuit including said adjustable resistance means.

6. The control circuit of claim 5 further including;
   means for supplying a blanking signal; and
   a transistor switch coupled to the grid and disposed to shut off the tube in response to the presence of the blanking signal.

7. A control circuit for controlling the beam current in a diode-gun camera tube having a control grid, the circuit being coupled to receive a video signal current which has a normal operating range in the absence of highlights which range corresponds to a normal beam current operating range, the combination comprising;
   circuit means coupled directly to the tube control grid from the video signal current to enable the tube to generate highlight suppressing beam currents exceeding the upper limit of the normal operating range thereof upon the occurrence of highlights, and including grid control means for increasing the highlight suppressing beam currents at a substantially constant preselected margin above the signal current.

8. The circuit of claim 7 wherein the circuit means further includes;
   pre-biased switch means for precluding an increase in the video signal current supplied to the grid control means as long as the video signal current remains within its normal operating range; and
   wherein the switch means supplies an enable signal current to the grid via the grid control means when the video signal current exceeds the upper limit of its normal operating range.

9. The circuit of claim 8 wherein the grid control means includes pre-calibrating means for establishing the substantially constant preselected margin, and for maintaining the margin between the beam current and the video signal current with increases in the latter caused by the occurrence of highlights.

10. A method for suppressing highlights which appear as large increases in the video signal current of a video camera, by controlling the beam current in the camera pickup tube thereof, the tube having a control grid and a substantially linear relationship between the control grid current and the beam current, comprising the steps of;
    establishing a preselected current margin between the beam current and the video signal current;
    pre-biasing the video signal current to define a normal operating range in the absence of highlights; and
    maintaining the preselected current margin between the beam current and the video signal current when the latter exceeds its normal operating range in the presence of highlights.

11. The method of claim 10 wherein the step of establishing includes;
    applying a selected current signal level commensurate with the upper limit of the normal operating range of the video signal current;
    pre-calibrating the control grid current in response to said selected current signal level to establish the preselected current margin.

12. The method of claim 11 wherein the step of pre-biasing includes;
    preventing any increase in the selected current signal level in the absence of highlights while the video signal level in the video signal current remains within its normal operating range; and
    increasing the selected current signal level when the video signal current exceeds the normal operating range in the presence of highlights while maintaining the preselected current margin between the beam current and the video signal current.

* * * * *